United States Patent [19]
Kanngiesser

[11] 3,942,089
[45] Mar. 2, 1976

[54] D.C. VOLTAGE TRANSFORMATION IN HIGH TENSION SYSTEMS

[75] Inventor: Karl Werner Kanngiesser, Viernheim, Germany

[73] Assignee: Brown, Boveri & Cie., AG, Mannheim, Germany

[22] Filed: Oct. 9, 1974

[21] Appl. No.: 513,388

[30] Foreign Application Priority Data
Oct. 10, 1973 Germany............................ 2350778

[52] U.S. Cl...................... 321/2; 307/82; 321/27 R
[51] Int. Cl.²........................................ H02M 3/315
[58] Field of Search ............ 321/2, 4, 27 R; 307/82

[56] References Cited
UNITED STATES PATENTS
3,448,286  6/1969  Stackegärd......................... 321/27 R
3,500,057  3/1970  Stackegärd ........................... 307/82

Primary Examiner—William M. Shoop
Attorney, Agent, or Firm—Toren, McGeady and Stanger

[57] ABSTRACT

A transmission substation for transforming a high D.C. voltage over an intermediate three phase A.C. network into a lower D.C. voltage. The substation includes an arrangement of inverters and rectifiers for effecting the transformation with reduced losses. Also encompassed is a similar reversed arrangement for stepping up from a lower D.C. voltage to a higher D.C. voltage.

5 Claims, 6 Drawing Figures

3,942,089

D.C. VOLTAGE TRANSFORMATION IN HIGH TENSION SYSTEMS

FIELD OF THE INVENTION

This invention relates to converter substations in HGU or high-tension D.C. transmission (derived from the German Hochspannungs-Gleichstrom-Übertragungs) system. More particularly, it relates to systems for transforming high tension D.C. voltages from one D.C. level to another.

BACKGROUND OF THE INVENTION

In the transmission of high tension energy, it is common for a first HGU D.C. network to supply a part of its energy to a second HGU D.C. network and to transmit the remaining power elsewhere. This may occur, for example, in the supply of power to a local community where a first high-voltage HGU network supplies a second HGU network of lower "high voltage". This second D.C. network is then connected to local converter substations which supply energy from the second HGU network to the A.C. voltage network of the community.

One such conventional conversion arrangement for converting high level D.C. from a first HGU network to a lower voltage HGU network is shown in FIG. 1. There, high tension lines 1, 2 supply the input +600 kv, −600 kv to a local inverter station. The input voltages are supplied to this first inverter station which includes current-director or inverter bridges 3, 4, 5 and inverter bridges 6, 7, and 8, symmetrical with respect to a common ground. Each of the inverters is coupled to a corresponding transformer, 9, 10, 11, 12, 13, and 14, which in turn is connected to a three-phase bus bar 15.

A second HGU network 24 is of similar but reversed design. That is, a three-phase bus bar 15b is connected to a reduced number of transformers 16, 17, 18 and 19 which in turn is connected to rectifier bridges 20, 21, 22 and 23. The two networks are connected by coupling switches 15a. Smoothing coils 27 may also be included as shown. The output voltages of the second network appear on lines 25 and 26 as reduced voltages +400 kv, −400 kv.

The efficiency of such a converter substation can be calculated as follows. If a current flows, for example, between terminals 1 and 2 over the bridges 3 to 8 which amounts to two-thirds of the nominal load Ia of the HGU D.C. network 24 (whose voltage is two-thirds of the voltage of the input D.C. network) and if the rated voltage of all converter bridges in $V_B$, then the installed converter power is:

Input Network = $2 \cdot 3 \cdot V_B \cdot 2/3 \; I_A = 4 \cdot V_B \cdot I_A$
Network 24 = $2 \cdot 2 \cdot V_B \cdot I_A = 4 \cdot V_B \cdot I_A$
Total = $8 \cdot V_B \cdot I_A$ It is desirable from a practical and economic standpoint to reduce this internal consumption of each converter as much as possible and to simplify the converter design.

It is accordingly an object of the present invention to provide a converter substation in HGU transmission which consumes comparatively little power and is of a simplified and economic design.

It is another object of the present invention to provide an HGU converter substation of simplified design for transforming a higher D.C. voltage to a lower D.C. voltage.

It is still another object of the present invention to provide an arrangement for converting a higher D.C. voltage to a lower D.C. voltage in an HGU system which utilizes a minimum number of converter bridges.

It is a still further object of the present invention to provide an arrangement for converting a higher D.C. voltage to a lower D.C. voltage which utilized a minimum number of smoothing elements.

It is also an object of the present invention to provide an HGU converter substation of simplified design which uses a minimum number of components and which consumes minimum power for transforming a lower D.C. voltage into a higher D.C. voltage.

SUMMARY OF THE INVENTION

In accordance with the present invention, an arrangement is provided for delivering energy from a first high tension D.C. network having first and second terminals having a high voltage to a second high tension D.C. network having first and second terminal with a lower voltage, such as in a converter substation. The arrangement comprises a plurality of converter bridges serially connected between the terminals of the first network, at least one of the bridges being disposed between the first terminal of the first network and the first terminal of the second network and being an inverter-type bridge and at least one of the bridges being disposed between the second terminal of the first network and the second terminal of the second network and also being an inverter-type bridge. The remaining bridges are disposed between the first and second terminals of the second network symmetrically to ground and are rectifier-type bridges. Also included is a three-phase current network which is coupled to the converter bridges.

Other and further objects of the present invention will be made clear by the following detailed description and drawings while the scope of the invention will be pointed out in the appended claims.

DETAILED DESCRIPTION OF THE INVENTION

Figure 1:
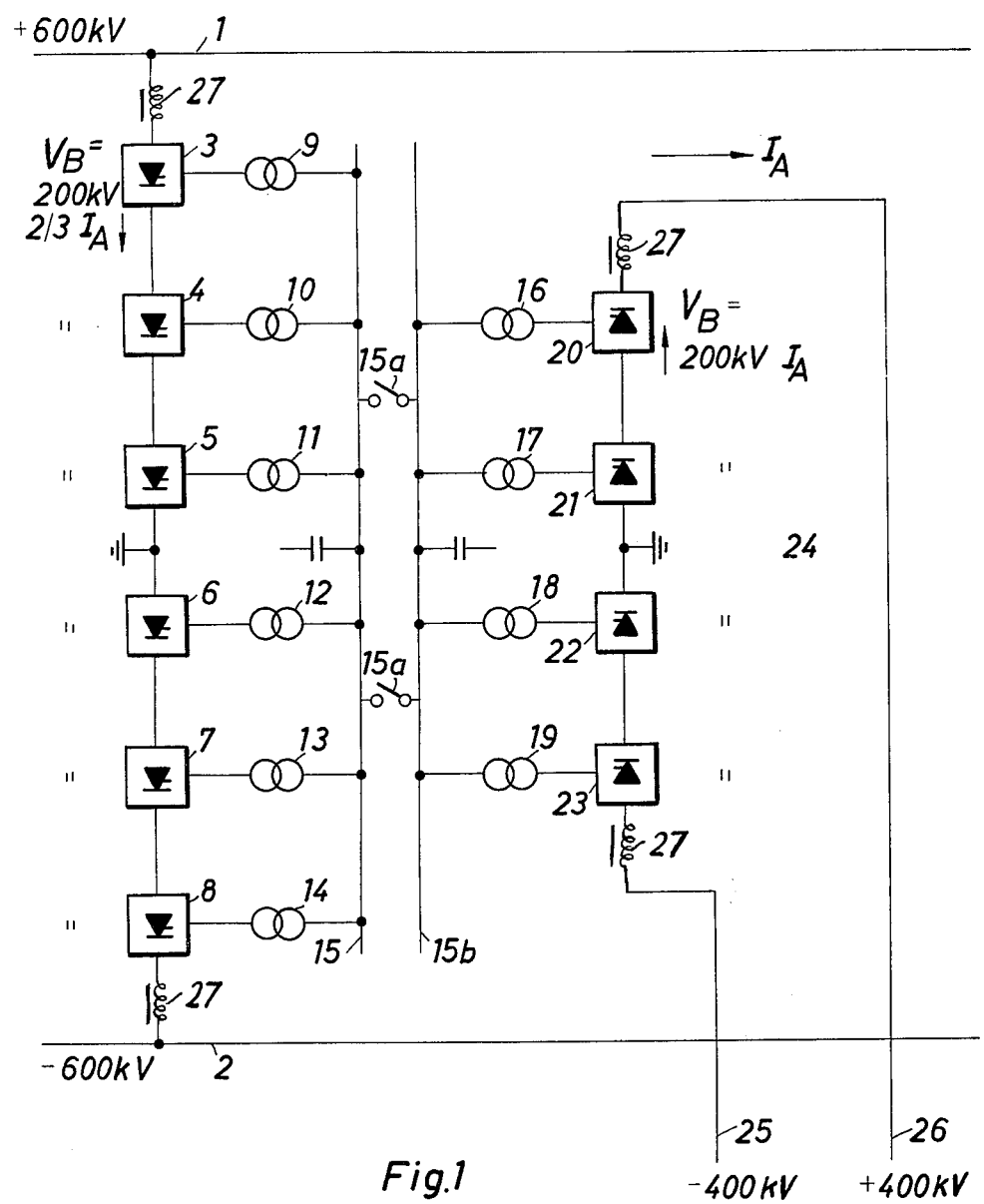
FIG. 1 presents a schematic representation of a conventional converter substation for transforming higher to lower HGU D.C. voltages.

As shown in FIG. 2, the terminals 1, 2 of a first HGU D.C. network have, for example, a potential $V_1$ of +600 kv and −600 kv respectively with relation to ground. A series of converter bridges, 28, 29, 30 and 31, is connected in series between the terminals 1 and 2. The converter bridges 28 and 31 are inverter bridges and the bridges 29 and 30 are rectifier bridges. The inverter bridge 28 is connected to the terminal bridges 1 exhibiting the voltage $V_B$. The bridge 28 energizes a bus bar 38 over a transformer 32. The bus bar 38 is also energized by the inverter bridge 31 through a transformer 33. The transformers 33 and 34 connected to the bus bar 38 energize the second HGU D.C. network at the terminals 25 and 26, through rectifier bridges 29 and 30 each rated at $2V_B$. The voltage at the terminals 25 and 26 is here 400 kv relative to ground. Elements 29 and 30 are connected to ground as shown in the figure. As stated, inverter bridges 28 and 31 are connected to transformers 32 and 35 which supply energy to the bus bar 38. The bus bar 38 is also connected by transformers 33 and 34 to rectifier bridges 29 and 30. The inverter elements 28 and 31 have a rated voltage of $V_B$ while the rectifier elements each have rated voltages of $2\ V_B$.

The second HGU network having terminals 25 are at a potential of $+V_2$, $-V_2$, which, for example, is +400 kv, −400 kv. The voltage is seen to be lower than the voltage $V_1$ of the first network. The terminals of the second network are coupled to the junction of the rectifier and inverter bridges 28 and 29 and to the junction of rectifier and inverter bridges 30 and 31. As shown, smoothing coils 36 and 37 are included in coupling the series converter bridge network to the first network terminals 1 and 2. Smoothing coils 36a and 37a are also included in series with the second network terminals 25 and 26.

The circuitry of the inverter and rectifier bridges are not shown as they are well known to those of ordinary skills in the art.

In contrast to the FIG. 1 conventional approach, it is seen that a converter substation in accordance with the present invention employs a substantially reduced number of parts. Furthermore, the power consumption of the arrangement of FIG. 2 may be calculated with the current through the second network designated as $I_A$, the current through the rectifier and inverter elements divide two-thirds to one-third as shown in FIG. 2.

| | |
|---|---|
| 1st Network Power = $2 \cdot V_B \cdot 2/3\ I_A = 4/3 V_B\ I_A$ | |
| 2nd Network Power = $2 \cdot V_B \cdot 1/3\ I_A = 4/3 V_B\ I_A$ | |
| Total | $8/3 V_B\ I_A$ |

Thus, the arrangement of the invention as shown in FIG. 2 requires only one-third of the power expenditure of the conventional arrangement of FIG. 1.

Bus bar 38 can be connected to an existing three-phase current network (not shown). Provided this network is powerful enough, the wattless (or reactive) power required by the converter bridges 28–31 can be supplied by this network. A part of the wattless power required can be made available by the filter circuits which are normally provided for receiving the harmonic currents. The arrangement is also operable if a three-phase current network is not available. In such case, the three-phase current network is represented by the bus bar 38. The required wattless power of the converter bridges can be made available by rotating phase shifters or condensers. In the former case, synchronous phase shifters can be used in known manner to regulate the bus bar voltage.

Figure 2A:
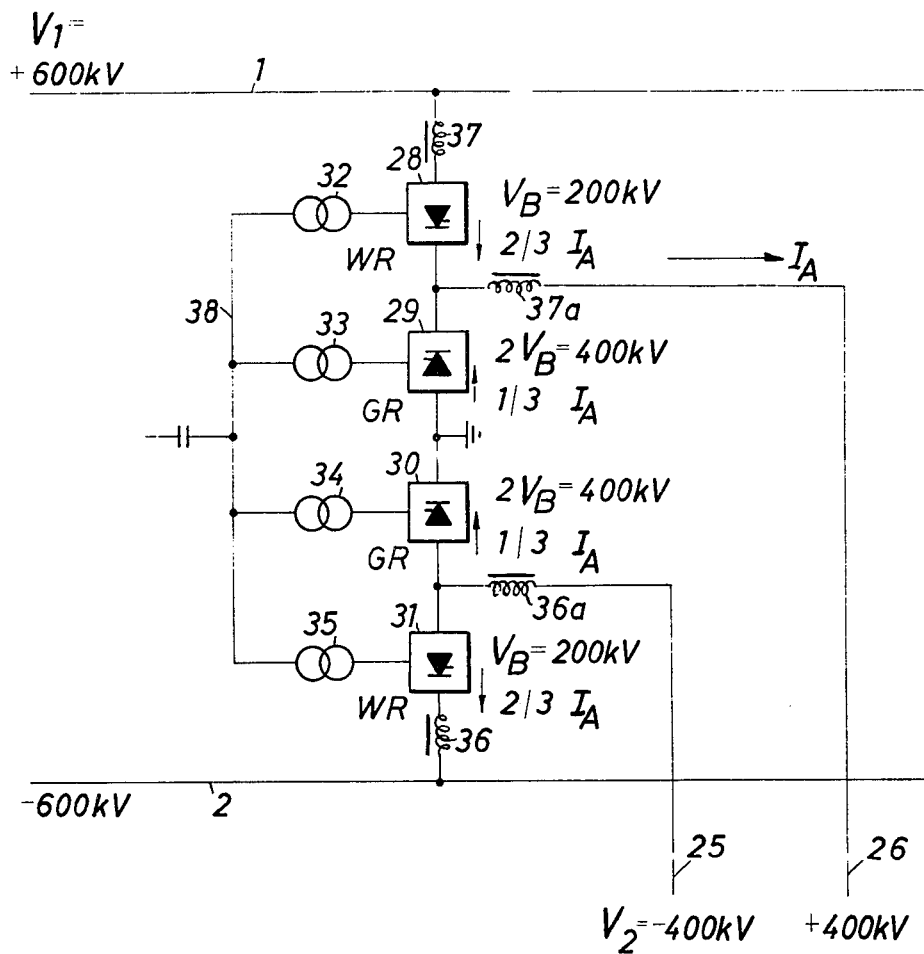
FIG. 2a represents in schematic form an arrangement for transforming higher D.C. voltages to lower D.C. voltages in HGU networks in accordance with the principles of the present invention.
Figure 2B:
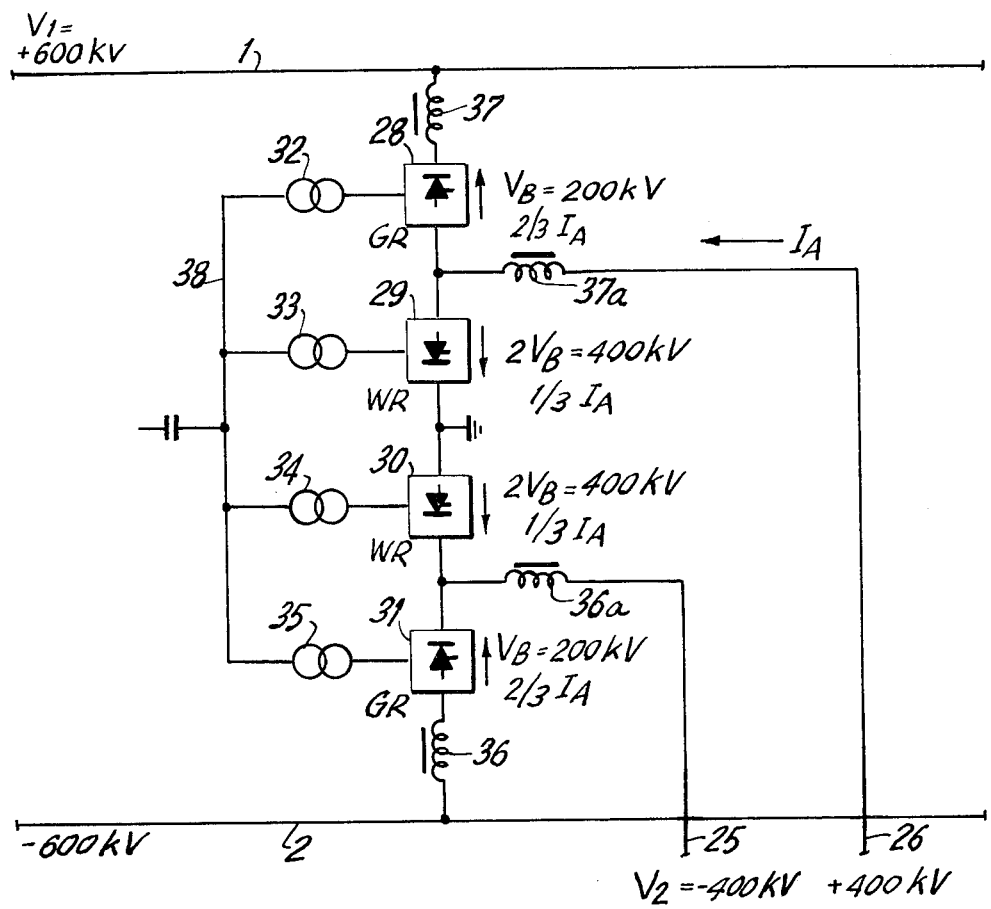
FIG. 2b represents in schematic form, an arrangement similar to FIG. 2a where energy direction is reversed.

Although the invention has been described with respect to direction of electrical energy from a higher voltage D.C. network for a lower voltage network, the invention is not so limited. The arrangement and mode of operation for the reverse direction of the energy for representation according to FIG. 2a is shown in FIG. 2b. In FIG. 2b the converters are arranged with reverse polarity, compared to FIG. 2a, and are controlled with the opposite mode of operation, that is, the converters 28 and 31 are operated as recitifiers, and the converters 29 and 30 as inverters. Furthermore the description of FIG. 2a applies in analogy to FIG. 2b.

Figure 5:
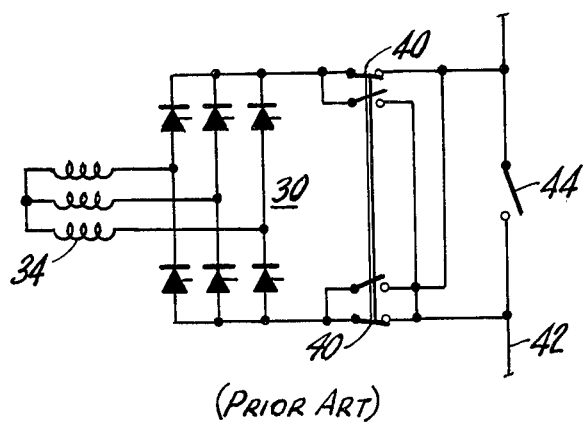
FIG. 5 is a schematic illustration of a known pole reversal arrangement for use with the present invention.

In order to permit in a simple manner the mutual transmission of energy in an arrangement according to FIG. 2a and FIG. 2b the individual converter bridges, as shown in FIG. 5 as exemplified by converter 30, and described in German DOS No. 1,513,827 in another connection, can be equipped with pole reversers 40 and a disconnecting switch 51 in the line 42 connecting the D.C. lines 1 and 2.

Figure 3:
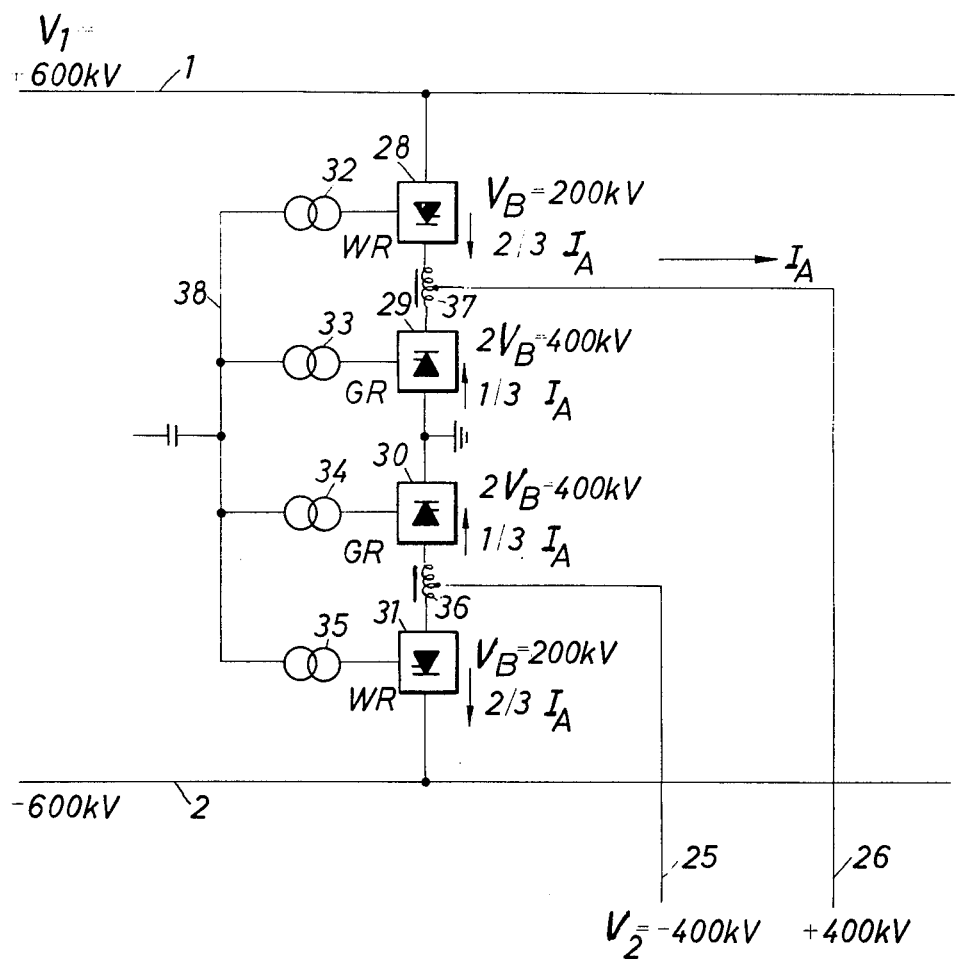
FIG. 3 is a schematic illustration of an alternate embodiment of the invention shown in FIGS. 2a and 2b with a reduced number of component parts.

Referring now to FIG. 3, shown there is an even simpler arrangement of the converter substation of FIG. 2. In this figure, like members are used to correspond to like elements of FIG. 3. The four smoothing chokes of FIG. 2 have been replaced with only two center-tapped chokes 36 and 37 which are placed at the junctions of the rectifier and converter. The center tap of each of the smoothing chokes is connected to the first and second terminals of the second D.C. network.

Figure 4:
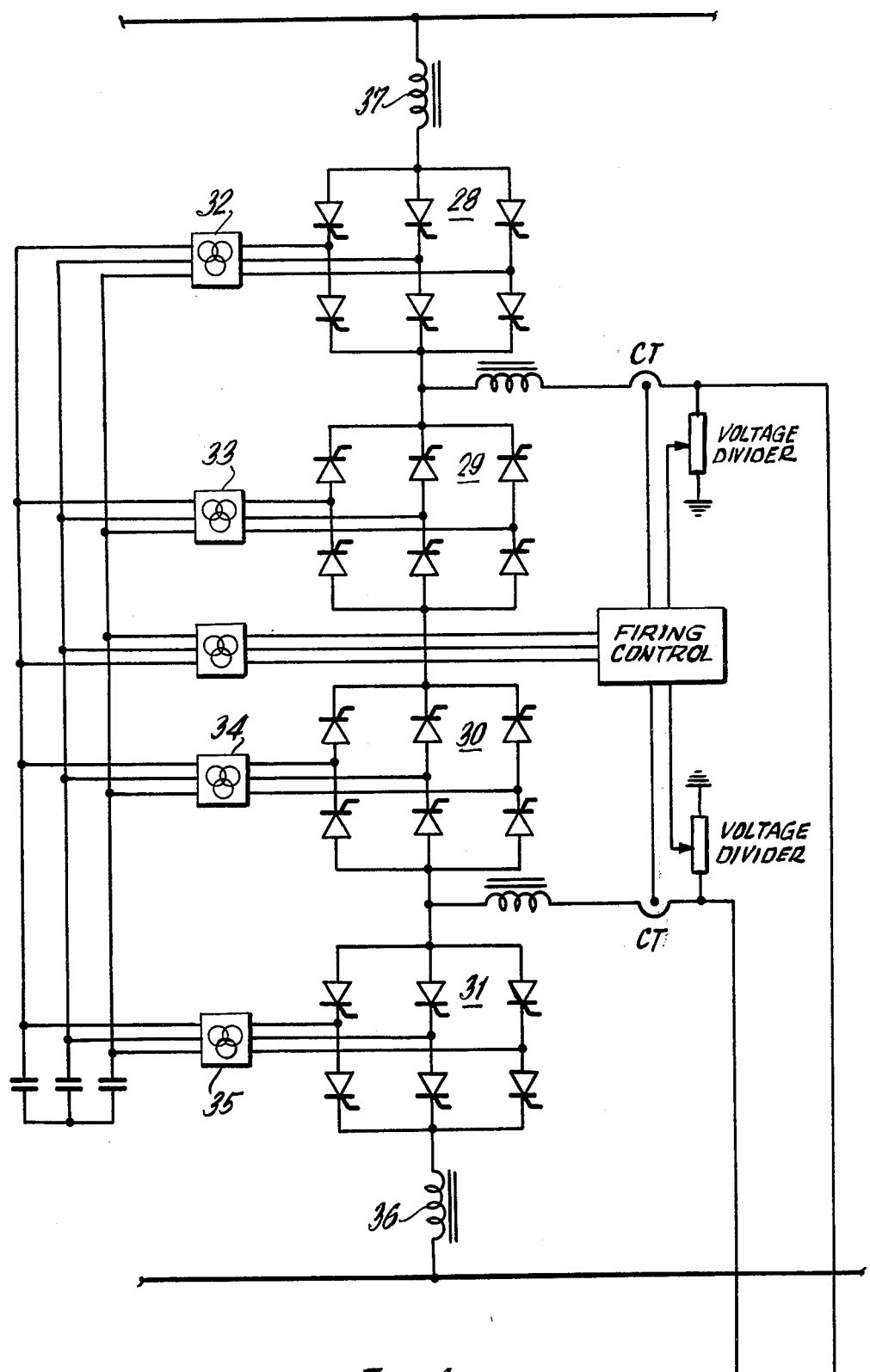
FIG. 4 is a more detailed circuit diagram of the FIGS. 2a and 2b arrangement.

FIG. 4 corresponds to the circuit of FIG. 2 and illustrates further details thereof.

While the invention has been described and illustrated with respect to preferred embodiments which provide satisfactory results, it should be understood by those skilled in the art that various changes and modifications may be made therein without departing from the true spirit and scope of the present invention.

What is claimed is:

1. A multiphase converter station comprising: a plurality of converter bridges, constituting at least two groups being disposed differently to ground, the A.C. sides of said bridges being connected in parallel to a three-phase current network, each bridge having a converter transformer, said converter bridges being connected in series between a first and a second terminal of a first high voltage D.C. network, each of said groups being provided with a D.C. tap between the outer and next to the outer converter bridges, to which taps a first and a second terminal of a second high voltage D.C. network with lower potential than the first network are connected, at least one of the bridges being disposed between said first terminal of said second network being an inverter-type bridge and at least one of said bridges being disposed between said second terminal of said first network and said second terminal of said second network also being an inverter-type bridge, the remaining bridges being disposed between said first and second terminals of said second network symmetrically to ground being rectifier-type bridges, wherein the inverter-type bridges direct current in the same direction as the voltage drop between the first and second terminals of the first network and the rectifier-type bridges direct current in the opposite direction.

2. The arrangement of claim 1 also including means for transmitting energy in a preselected direction, said means including pole reversing isolating switches being disposed in each of said converter bridges.

3. The arrangement of claim 1 wherein means for smoothing A.C. ripple are symmetrically disposed between inverter and rectifier bridge groups, said means including taps, said taps being connected to said first and second terminals of said second D.C. network.

4. A multiphase converter station comprising: a plurality of converter bridges, constituting at least two groups being disposed differently to ground, the A.C. sides of said bridges being connected in parallel to a three-phase current network, each bridge having a converter transformer, said converter bridges being connected in series between a first and a second terminal of a first high voltage D.C. network, each of said groups being provided with a D.C. tap between the outer and next to the outer converter bridges, to which taps a first and a second terminal of a second high voltage D.C. network with lower potential than the first network are connected, at least one of those bridges being disposed between said first terminal of said first network and said first terminal of said second network being a rectifier-type bridge and at least one of those bridges being disposed between said second terminal of said first network and said second terminal of said second network also being a rectifier-type bridge, the remaining bridges being disposed between said first and second terminals of said second network to ground being inverter-type bridges, wherein the rectifier-type bridges direct current in the same direction as the voltage drop from the first to second terminals of the second network and the inverter-type bridges direct current in the opposite direction.

5. The arrangement of claim 4 wherein means for smoothing A.C. ripple are symmetrically disposed between inverter and rectifier bridge groups, said means including taps, said taps being connected to said first and second terminals of said second D.C. network.

* * * * *

UNITED STATES PATENT OFFICE
CERTIFICATE OF CORRECTION

Patent No. 3,942,089      Dated March 2, 1976

Inventor(s) KARL WERNER KANNGIESSER      Page 1 of 2

It is certified that error appears in the above-identified patent and that said Letters Patent are hereby corrected as shown below:

Claim 1, Col. 4, line 43,    after "disposed" delete "differently";

same line,    after "ground" insert -- between the two groups --;

line 53,    before "the bridges" delete "at least one of"

line 54,    before "said sec-" insert -- said first network and said first terminal of --;

line 55,    before "inverter" delete "an"; change "bridge" to -- bridges --; and at end of line delete "at least";

line 56,    at beginning of line delete "one of";

line 58,    after "being" delete "an";

line 59,    change "bridge" (first occurrence) to -- bridges --;

line 62,    after "wherein" insert -- in --; and after "current" insert -- flows --;

line 64,    after "and" insert -- wherein in --;

line 65,    after "current" insert -- flows --

UNITED STATES PATENT OFFICE
CERTIFICATE OF CORRECTION

Patent No. 3,942,089              Dated March 2, 1976

Inventor(s) KARL WERNER KANNGIESSER      Page 2 of 2

It is certified that error appears in the above-identified patent and that said Letters Patent are hereby corrected as shown below:

<u>Claim 4</u>, Col. 5, line 10, after "disposed" delete "differently" and insert -- between the two groups --;

line 20, before "bridges" delete "at least one of those";

Col. 6, line 3, after "being" delete "a"; change "bridge" to -- bridges --; and at end of line delete "at least one of those" and insert -- said -- line 6, after "being" delete "a"; and change "bridge" to -- bridges --;

line 9, after "wherein" insert -- in --; and change "rectifier" to -- inverter --;

line 10, after "current" insert -- flows -- line 11, at end of line delete "sec-" and insert -- first --;

line 12, at beginning of line delete "ond"; after "and" insert -- in --; and before "-type" change "inverter" to -- rectifier -- line 13, after "rent" insert -- flows --

Signed and Sealed this

Twenty-third Day of November 1976

[SEAL]

Attest:

RUTH C. MASON
Attesting Officer

C. MARSHALL DANN
Commissioner of Patents and Trademarks